(12) United States Patent
Nakamura et al.

(10) Patent No.: US 11,606,541 B2
(45) Date of Patent: Mar. 14, 2023

(54) PROJECTION CONTROL DEVICE, PROJECTION CONTROL METHOD AND PROJECTION CONTROL SYSTEM

(71) Applicant: PANASONIC INTELLECTUAL PROPERTY MANAGEMENT CO., LTD., Osaka (JP)

(72) Inventors: Hideyuki Nakamura, Fukuoka (JP); Ryuji Fuchikami, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 66 days.

(21) Appl. No.: 17/266,732

(22) PCT Filed: Aug. 7, 2019

(86) PCT No.: PCT/JP2019/031249
§ 371 (c)(1),
(2) Date: Jul. 22, 2021

(87) PCT Pub. No.: WO2020/032140
PCT Pub. Date: Feb. 13, 2020

(65) Prior Publication Data
US 2022/0021856 A1 Jan. 20, 2022

(30) Foreign Application Priority Data
Aug. 9, 2018 (JP) .............. JP2018-150634

(51) Int. Cl.
*H04N 9/31* (2006.01)
(52) U.S. Cl.
CPC ................ *H04N 9/3185* (2013.01)
(58) Field of Classification Search
CPC ...... G06T 3/005; G03B 21/13; H04N 9/3185; H04N 9/3194; H04N 9/31
See application file for complete search history.

(56) References Cited

U.S. PATENT DOCUMENTS

| 10,685,478 B1* | 6/2020 | Laurino | G06F 3/013 |
| 2012/0069180 A1* | 3/2012 | Kawamura | H04N 9/3194 353/7 |

(Continued)

FOREIGN PATENT DOCUMENTS

| JP | 2004-304472 | 10/2004 |
| JP | 2013-192189 | 9/2013 |

(Continued)

OTHER PUBLICATIONS

International Search Report issued in International Patent Application No. PCT/JP2019/031249, dated Nov. 5, 2019, along with an English translation thereof.

(Continued)

*Primary Examiner* — John W Miller
*Assistant Examiner* — Humam M Satti
(74) *Attorney, Agent, or Firm* — Greenblum & Bernstein, P.L.C.

(57) ABSTRACT

A projection control device includes: a communication unit connected to communicate with an image capturing device configured to capture an image of a target object positioned around a projected object; a derivation unit configured to derive a projection position of a content image based on designation of a parameter related to the content image to be projected onto the projected object and an image of the projected object including the target object; a projection image generation unit configured to generate a projection image including the content image disposed at the derived projection position; and a control unit configured to transmit a projection instruction of the projection image to a projection device via the communication unit.

11 Claims, 14 Drawing Sheets

(56) References Cited

U.S. PATENT DOCUMENTS

2016/0191877 A1  6/2016 Ono
2019/0116356 A1* 4/2019 Matoba .................. G09G 5/00

FOREIGN PATENT DOCUMENTS

| JP | 2016-081497 | 5/2016 |
| JP | 2016-085380 | 5/2016 |
| JP | 2016-122179 | 7/2016 |

OTHER PUBLICATIONS

Written Opinion issued in International Patent Application No. PCT/JP2019/031249, dated Nov. 5, 2019, along with an English translation thereof.

* cited by examiner

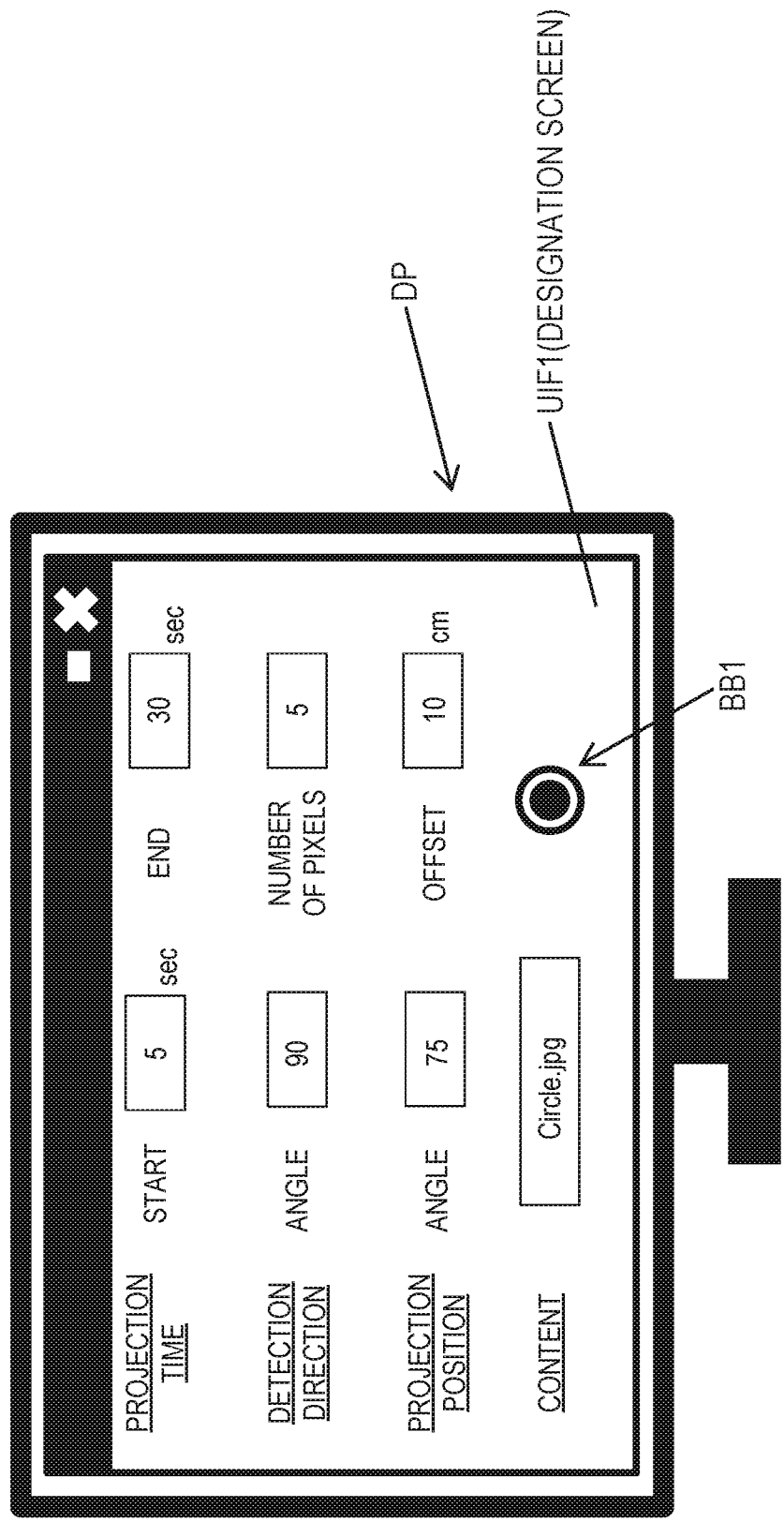

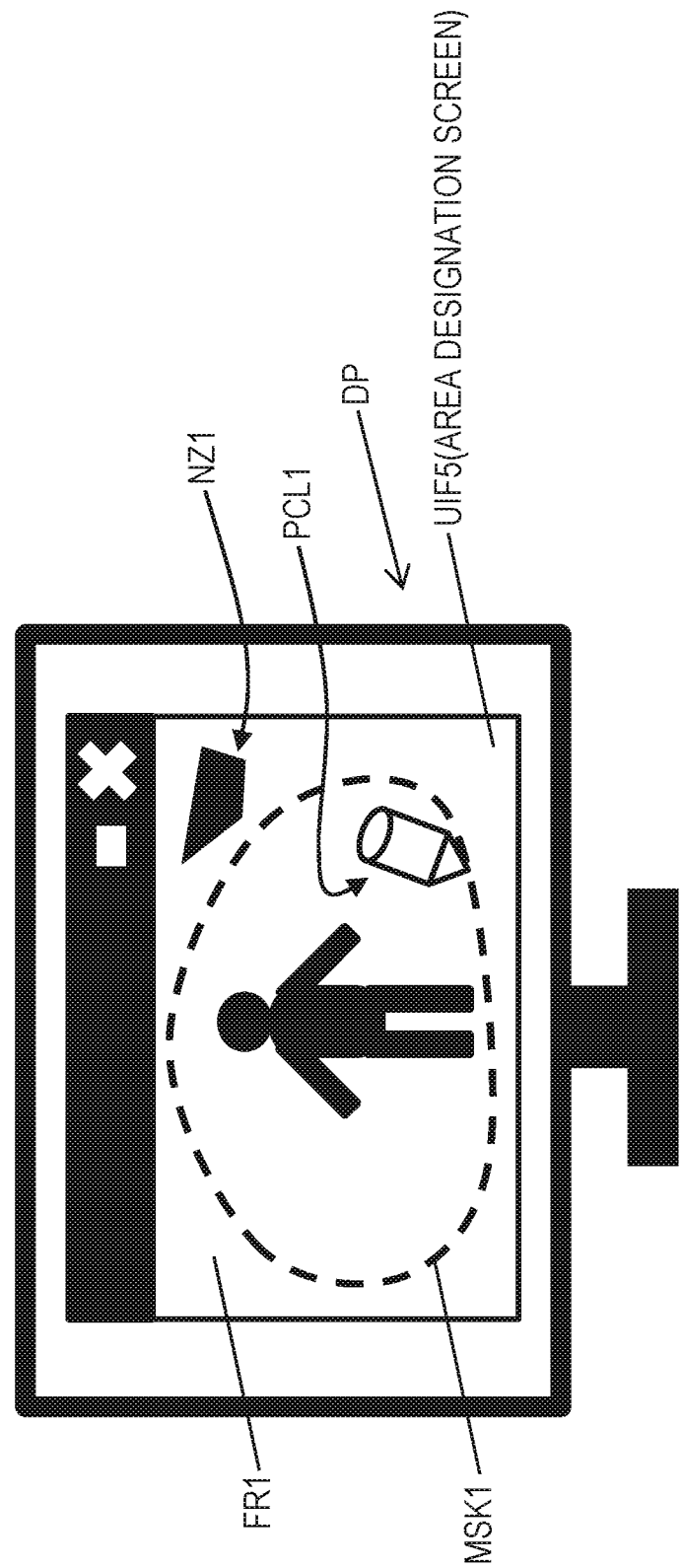

PROJECTION CONTROL DEVICE, PROJECTION CONTROL METHOD AND PROJECTION CONTROL SYSTEM

TECHNICAL FIELD

The present disclosure relates to a projection control device, a projection control method and a projection control system that control projection of an image onto a projected object.

BACKGROUND ART

Patent Literature 1 discloses an image processing device of a projection mapping device that inputs an image including an image of a projected object captured by an electronic camera, subjects the input image to coordinate conversion from a coordinate system of the electronic camera to a coordinate system of a display screen, and extracts a closed area of an image of the projected object from the image subjected to the coordinate conversion. The image processing device maps an object to the extracted closed area and generates a video signal of a screen including the mapped object. According to Patent Literature 1, the image processing device can map a texture on a surface of the projected object even when the projected object changes a shape thereof, moves, or the like.

CITATION LIST

Patent Literature

Patent Literature 1: JP-A-2013-192189

SUMMARY OF INVENTION

Technical Problem

However, in the configuration of Patent Literature 1, it is necessary to continue to specify the closed area of the image of the projected object (in other words, a contour of the projected object) while an event such as a shape change or a movement of the projected object occurs, and a corresponding processing load is applied to the image processing device to extract the closed area of the image of the projected object. Therefore, for example, when the projected object is a person who moves fast like a dancer, it is difficult to perform a processing of following the fast movement of the dancer and specifying the contour of the image of the projected object, and there is a problem that followability may deteriorate.

For example, when a person such as a dancer is set as the projected object, if a user such as a director can easily designate a position where a content image is projected with respect to a position of the dancer who is the projected object, improvement of convenience for the user is expected. However, with the configuration of Patent Literature 1, it is not easy to improve the above-described convenience for the user.

The present disclosure has been made in view of the above-described circumstances, and an object thereof is to provide a projection control device, a projection control method and a projection control system that implement projection control based on accurate and simple designation of a projection position of a content image that follows a movement of a target object around a projected object and adaptively support improvement of user convenience.

Solution To Problem

The present disclosure provides a projection control device including: a communication unit connected to communicate with an image capturing device configured to capture an image of a target object positioned around a projected object; a derivation unit configured to derive a projection position of a content image based on designation of a parameter related to the content image to be projected onto the projected object and an image of the projected object including the target object; a projection image generation unit configured to generate a projection image including the content image disposed at the projection position which has been derived; and a control unit configured to transmit a projection instruction of the projection image which has been generated to a projection device via the communication unit.

The present disclosure provides a projection control method of a projection control device, the projection control method including: a step of connecting the projection control device to an image capturing device to communicate with each other, the image capturing device being configured to capture an image of a target object positioned around a projected object; a step of deriving a projection position of a content image based on designation of a parameter related to the content image to be projected onto the projected object and an image of the projected object including the target object; a step of generating a projection image including the content image disposed at the projection position which has been derived; and a step of transmitting a projection instruction of the projection image to a projection device which has been derived.

The present disclosure provides a projection control system in which an image capturing device configured to capture an image of a target object positioned around a projected object and a projection control device are connected to communicate with each other, in which the projection control device includes: a derivation unit configured to derive a projection position of a content image based on designation of a parameter related to the content image to be projected onto the projected object and an image of the projected object including the target object; a projection image generation unit configured to generate a projection image including the content image disposed at the projection position which has been derived; and a control unit configured to transmit a projection instruction of the projection image which has been generated to a projection device.

Advantageous Effects of Invention

According to the present disclosure, it is possible to implement projection control based on accurate and simple designation of a projection position of a content image that follows a movement of a target object around a projected object, and it is possible to adaptively support improvement of user convenience.

BRIEF DESCRIPTION OF DRAWINGS

FIG. 5A is a diagram showing an example of a designation screen based on an angle.

FIG. 7A is a diagram showing an example of a designation screen of a calculation target area of a projection position.

DESCRIPTION OF EMBODIMENTS

Hereinafter, an embodiment in which a projection control device, a projection control method and a projection control system according to the present disclosure are specifically disclosed will be described in detail with reference to the accompanying drawings as appropriate. However, unnecessarily detailed description may be omitted. For example, detailed description of a well-known matter or repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

Hereinafter, the projection control system according to the embodiment recognizes, for example, a shape of a person (an example of a target object) on a screen (an example of a projected object) installed in a store based on an image captured by a visible camera (an example of an image capturing device) or an infrared ray (IR) camera (an example of an image capturing device). Based on the recognized shape of the person and parameters (see below) designated by a user (for example, an administrator or an operator of a projection control system 100), the projection control system generates a projection image in which a content image recorded in advance is disposed at a projection position and projects the generated projection image from a projector toward the screen. The projection control system may be installed inside the store (in other words, indoors) or may be installed outside the store (in other words, outdoors).

(Configuration of Projection Control System)

Figure 1:
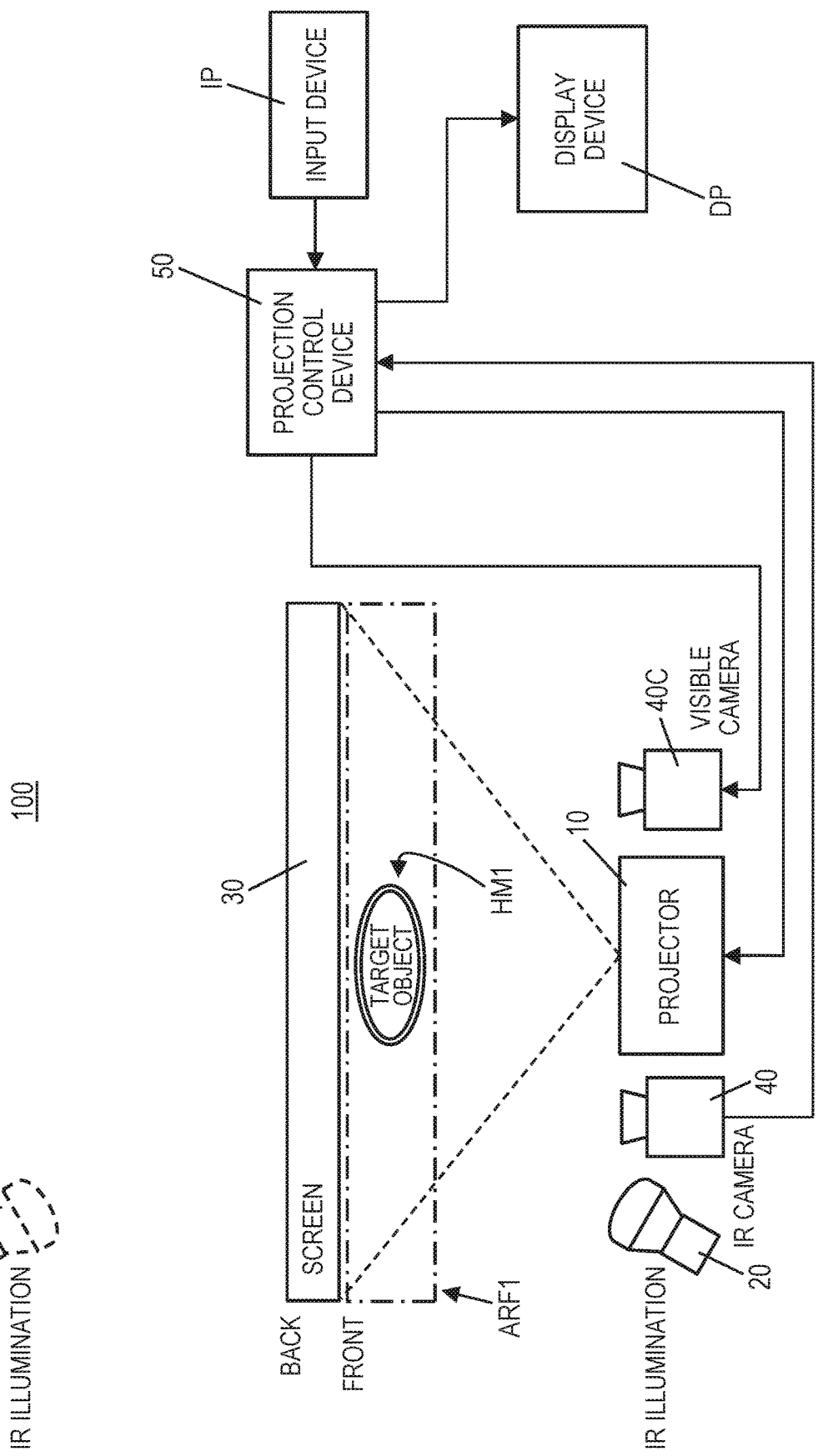
FIG. 1 is a diagram showing an installation example of a projection control system according to a first embodiment.

FIG. 1 is a diagram showing an installation example of the projection control system 100 according to a first embodiment. The projection control system 100 includes at least a projector 10, an IR illumination 20, a screen 30, an IR camera 40, a visible camera 40C, and a projection control device 50. An input device IP and a display device DP are connected to the projection control device 50 so that data or information can be input and output. Some or all of the projector 10, the IR illumination 20, the screen 30, the IR camera 40, the visible camera 40C, the projection control device 50, the input device IP, and the display device DP may be configured in an integrated device. Further, for example, the input device IP, the display device DP, a content storage database 53, and a recording device 54 may be configured as separate bodies connected to the projection control device 50 via a network. Furthermore, the projection control device 50 may be configured to include the input device IP and the display device DP.

The projector 10 (an example of a projection device) includes, for example, a cylindrical housing, and is connected to the projection control device 50 such that data or information can be transmitted to and received from the projection control device 50. The projector 10 is disposed to face the screen 30. When receiving a projection image included in a projection instruction sent from the projection control device 50, the projector 10 generates projection light (for example, visible light) for projecting the projection image designated by the projection instruction onto the screen 30 to project the generated projection light toward the screen 30 based on the projection instruction. Accordingly, the projector 10 can project the projection image (see below) designated by the projection control device 50 onto the screen 30. Details of the projector 10 will be described with reference to FIG. 2.

The IR illumination 20 (an example of a light source device) includes a housing in which a plurality of illumination elements (for example, light emission diode (LED) elements that emit IR light (near-infrared light)) and a control board (not illustrated) for controlling presence or absence of light emission in the illumination elements are built-in, and is separate from the housing of the projector 10. The IR illumination 20 may be connected to the projection control device 50 such that data or information can be transmitted to and received from the projection control device 50, or may not be connected to communicate with the projection control device 50 for transmission and reception of the data or the information. Similar to the projector 10, the IR illumination 20 may be disposed so as to face the screen 30, or may be disposed on an opposite side across the screen 30. The IR illumination 20 is turned on based on, for example, a manual operation of the administrator of the projection control system 100 or a control instruction from the projection control device 50, and irradiates the screen 30 with the IR light having a wavelength band different from that of the above-described projection light.

The IR illumination 20 may include, for example, a cylindrical housing integrally attached along a periphery of the cylindrical housing of the projector 10 in a radial direction. In this case, the plurality of illumination elements (for example, LED elements that emit the IR light) and the control board (see the above description) are built in the cylindrical housing. That is, the plurality of illumination elements (for example, the LED elements that emit the IR light) are arranged side by side in an annular shape along the periphery of the cylindrical housing of the projector 10 in the radial direction.

In the projection control system 100, the IR light emitted from the IR illumination 20 has a wavelength band different from that of the projection light (the visible light) projected from the projector 10, and the IR camera 40 receives the IR light instead of the visible light and captures an image. This is because, based on an infrared captured image captured by the IR camera 40, the projection control device 50 detects a position of the target object HM1 (for example, a person) that exists around (for example, in front of) the screen 30 disposed so as to be included in an angle of view of the IR camera 40 with high accuracy and without erroneously recognizing the position of the target object HM1.

For example, when the IR illumination 20 is installed on a front side of the screen 30, the screen 30 (an example of the projected object) is formed using a material that can reflect or absorb infrared light emitted from the IR illumination 20, and is fixedly installed. For example, when the IR illumination 20 is installed on a back side of the screen 30, the screen 30 may be formed using a material that can transmit the infrared light emitted from the IR illumination 20, and may be fixedly installed. The front side and the back side of the screen 30 follow FIG. 1. The IR light reflected by the screen 30 or the IR light transmitted through the screen 30 is received by the IR camera 40.

The IR camera 40 (an example of the image capturing device) is connected to the projection control device 50 such that data or information can be transmitted to and received from the projection control device 50. The IR camera 40 is disposed to face an entirety (an entire region) of the screen 30 so as to completely include the entirety (the entire region) of the screen 30 within an angle of view. The IR camera 40 receives the IR light incident on the IR camera 40 when the IR light is emitted from the IR illumination 20, and captures an image based on the received IR light, so that an infrared captured image (hereinafter, also referred to as "IR image") is generated. The IR camera 40 sends the generated IR image to the projection control device 50. Details of the IR camera 40 will be described with reference to FIG. 2.

As shown in FIG. 1, the projector 10 and the IR camera 40, or the IR illumination 20 and the IR camera 40 may not be arranged so as to exist on the same axis with each other.

The visible camera 40C (an example of the image capturing device) is connected to the projection control device 50 such that data or information can be transmitted to and received from the projection control device 50. The visible camera 40C is disposed to face an entirety (an entire region) of the screen 30 so as to completely include the entirety (the entire region) of the screen 30 within an angle of view. The visible camera 40C receives ambient light including the visible light transmitted through the screen 30 and captures an image based on the received ambient light, so that a visible captured image (that is, a color image based on color components of red (R), green (G), and blue (B)) is generated. The visible camera 40C sends the generated visible captured image to the projection control device 50. Details of the visible camera 40C will be described with reference to FIG. 2.

As shown in FIG. 1, the visible camera 40C is disposed on the same side as that of the IR camera 40 with respect to the screen 30. The visible camera 40C is disposed, for example, around the projector 10. Accordingly, the visible camera 40C can capture a visible captured image in which the shape of the target object HM1 such as a person around the screen 30 can be visually and specifically specified.

A position of the target object HM1 (for example, a person) is not limited to a position shown in FIG. 1 as long as the target object HM1 is positioned within a target object area ARF1 provided on an IR camera 40 side of the screen 30. That is, the target object HM1 may be positioned at any location in the target object area ARF1. The target object area ARF1 is an area where a person positioned between the IR illumination 20 and the IR camera 40 exists, similar to the screen 30. Further, it is preferable that the target object area ARF1 is specifically visualized by, for example, drawing a frame line or the like on a floor when viewed from the target object HM1 (for example, a person). Accordingly, it is possible to prevent the target object HM1 such as a person from moving to an outside of the target object area ARF1. However, the visualization of the target object area ARF1 may not be essential. Further, the target object area ARF1 may be instructed to the target object HM1 such as a person by, for example, a suggestion "Please stand in front of the screen" from the projector 10, another projector (not illustrated), a signboard, a system administrator, or the like.

The projection control device 50 is, for example, an information processing device capable of wired or wireless communication such as a personal computer (PC) or a tablet terminal, and is connected to at least the projector 10, the IR camera 40, the input device IP, and the display device DP such that data or information can be transmitted and received. Based on the infrared captured image captured by the IR camera 40, the projection control device 50 recognizes presence or absence of the target object HM1 such as a person positioned around (for example, in front of) the screen 30 and a shape indicating the position of the target object HM1 such as the person with respect to the screen 30.

The projection control device 50 holds a content image that is a target projected onto the screen 30, and displays a designation screen (for example, see FIGS. 5A, 5B, 5C, and 5D) for allowing the user to designate a projection position for projecting the content image, on the display device DP. Based on parameters (see below) designated on the designation screen, the projection control device 50 calculates and derives the projection position of the content image, generates a projection image in which the content image is disposed at the projection position, and sends the generated projection image to the projector 10. Details of the projection control device 50 will be described with reference to FIG. 2.

The input device IP is, for example, a device that can receive an operation of the user (for example, the administrator or the operator of the projection control system 100) of the projection control system 100, such as a keyboard or a mouse, and is a user interface that transmits a signal corresponding to the operation of the user to the projection control device 50.

The display device DP is configured using, for example, a liquid crystal display (LCD) or an organic electroluminescence (EL) display, acquires a display instruction of the data or the information transmitted from the projection control device 50, and displays the data or the information included in the acquired display instruction. The display device DP may be configured as a touch panel that can receive and detect the operation of the user. In the projection control system 100 according to the first embodiment, the input device IP and the display device DP may be omitted.

Figure 2:
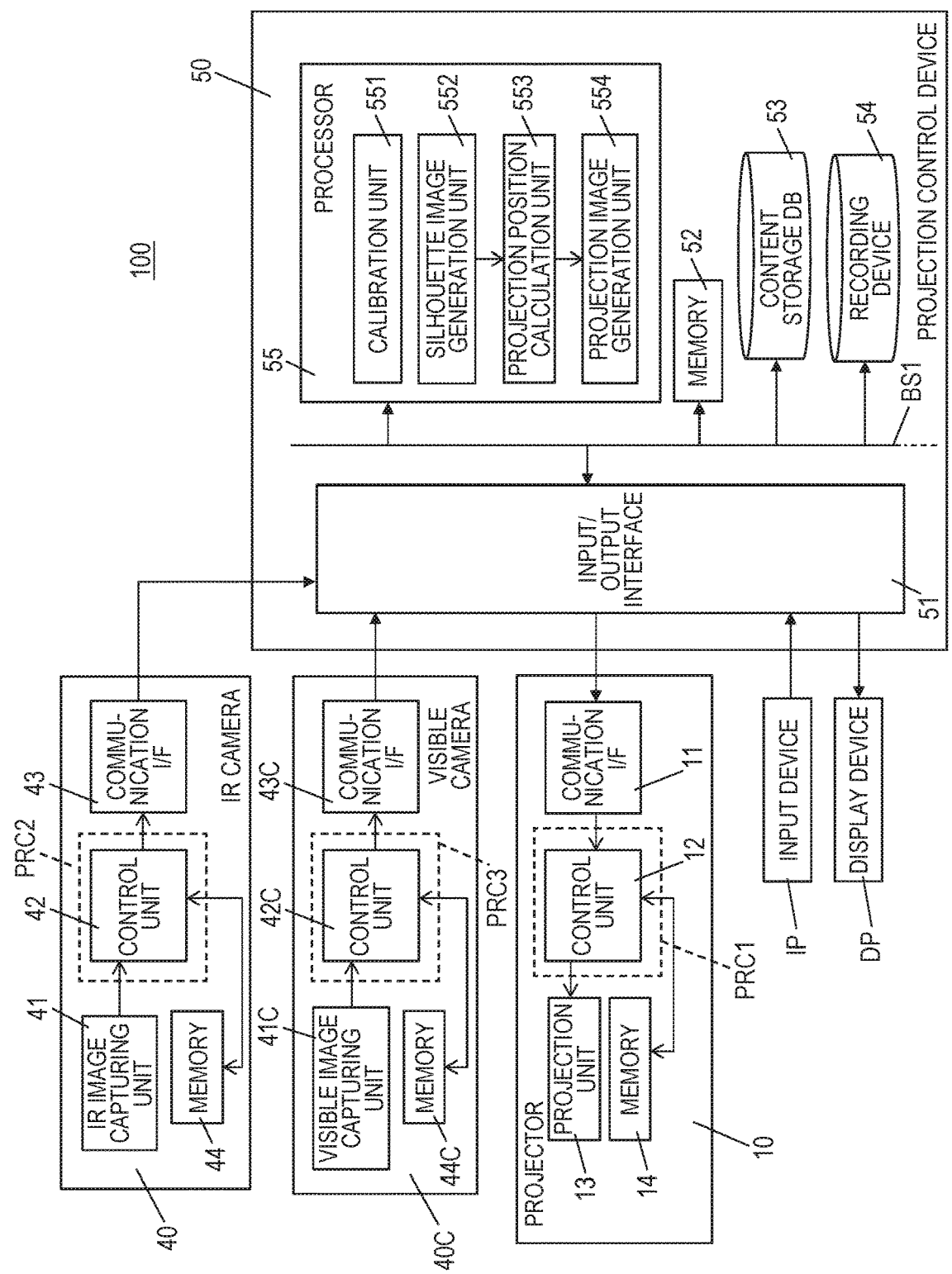
FIG. 2 is a block diagram showing in detail a system configuration example of the projection control system according to the first embodiment.

FIG. 2 is a block diagram showing in detail a system configuration example of the projection control system 100 according to the first embodiment.

The projector 10 includes a communication interface 11, a control unit 12, a projection unit 13, and a memory 14. In a configuration of the projector 10 of FIG. 2, the communication interface is described as "communication I/F" for convenience.

The communication interface 11 is configured with a communication circuit that can transmit and receive (communicate) data or information to and from the projection control device 50, and when receiving a projection instruction including a projection image sent from the projection control device 50, the communication interface 11 sends the projection instruction to the control unit 12.

The control unit 12 is, for example, a processor PRC1 configured using a central processing unit (CPU), a micro processing unit (MPU), a digital signal processor (DSP), or a field programmable gate array (FPGA). The control unit 12 functions as a controller that administrates overall operations of the projector 10, and performs a control processing for controlling an operation of each component of the projector 10, a data input/output processing to and from each component of the projector 10, a data arithmetic operation (calculation) processing, and a data storage processing. The control unit 12 operates according to a program and data stored in the memory 14. The control unit 12 uses the memory 14 during an operation, and temporarily saves data or information generated or acquired by the control unit 12 in the memory 14.

The projection unit 13 is subjected to projection control by the control unit 12, and emits projection light (visible light) corresponding to the projection image generated by the projection control device 50 to project the emitted projection light onto the screen 30. Specifically, the projection unit 13 emits projection light for projecting a projection image onto the screen 30 based on the projection image sent from the control unit 12. The projection unit is configured with, for example, a light source, a mirror, a lens, and the like.

The memory 14 is configured using, for example, a random access memory (RAM) and a read only memory (ROM), and temporarily holds a program and data necessary for executing an operation of the projector 10, and data or information generated during the operation. The RAM is, for example, a work memory used when the projector 10 operates. The ROM stores and holds, for example, a program and data for controlling the projector 10 in advance.

The IR camera 40 includes an IR image capturing unit 41, a control unit 42, a communication interface 43, and a memory 44. Also in the configuration of the IR camera 40 of FIG. 2, the communication interface is similarly described as "communication I/F" for convenience.

The IR image capturing unit 41 includes a lens (not illustrated) that can receive light incident after IR light emitted from the IR illumination 20 is transmitted through or reflected by the screen 30, and an image sensor (not illustrated) that can capture an infrared captured image based on the incident light. An output of the IR image capturing unit 41 is sent to the control unit 42.

The control unit 42 is, for example, a processor PRC2 configured using a CPU, an MPU, a DSP, or an FPGA. The control unit 42 functions as a controller that administrates overall operations of the IR camera 40, and performs a control processing for controlling an operation of each component of the IR camera 40, a data input/output processing to and from each component of the IR camera 40, a data arithmetic operation (calculation) processing, and a data storage processing. The control unit 42 operates according to a program and data stored in the memory 44. The control unit 42 uses the memory 44 during an operation, and temporarily saves data or information generated or acquired by the control unit 42 in the memory 44. The control unit 42 generates data of an infrared captured image by performing a predetermined image processing based on, for example, an output of the image sensor of the IR image capturing unit 41.

The communication interface 43 is configured with a communication circuit that can transmit and receive (communicate) data or information to and from the projection control device 50, and when acquiring the infrared captured image generated by the control unit 42, the communication interface 43 transmits the acquired infrared captured image to the projection control device 50.

The memory 44 is configured using, for example, a RAM and a ROM, and temporarily holds a program and data necessary for executing an operation of the IR camera 40, and data or information generated during the operation. The RAM is, for example, a work memory used when the IR camera 40 operates. The ROM stores and holds, for example, a program and data for controlling the IR camera 40 in advance.

The visible camera 40C includes a visible image capturing unit 41C, a control unit 42C, a communication interface 43C, and a memory 44C. Also in the configuration of the visible camera 40C of FIG. 2, the communication interface is similarly described as "communication I/F" for convenience.

The visible image capturing unit 41C includes a lens (not illustrated) that can receive ambient light such as visible light transmitted through the screen 30, and an image sensor (not illustrated) that can capture a visible captured image based on the ambient light. An output of the visible image capturing unit 41C is sent to the control unit 42C.

The control unit 42C is, for example, a processor PRC3 configured using a CPU, an MPU, a DSP, or an FPGA. The control unit 42C functions as a controller that administrates overall operations of the visible camera 40C, and performs a control processing for entirely controlling an operation of each component of the visible camera 40C, a data input/output processing to and from each component of the visible camera 40C, a data arithmetic operation (calculation) processing, and a data storage processing. The control unit 42C operates according to a program and data stored in the memory 44C. The control unit 42C uses the memory 44C during an operation, and temporarily saves data or information generated or acquired by the control unit 42C in the memory 44C. The control unit 42C generates data of a visible captured image by performing a predetermined image processing based on, for example, an output of the image sensor of the visible image capturing unit 41C.

The communication interface 43C is configured with a communication circuit that can transmit and receive (communicate) data or information to and from the projection control device 50C, and when acquiring the visible captured image generated by the control unit 42C, the communication interface 43C transmits the acquired visible captured image to the projection control device 50C.

The memory 44C is configured using, for example, a RAM and a ROM, and temporarily holds a program and data necessary for executing the operation of the visible camera 40C, and data or information generated during the operation. The RAM is, for example, a work memory used when the visible camera 40C operates. The ROM stores and holds, for example, a program and data for controlling the visible camera 40C in advance.

The projection control device 50 includes an input/output interface 51, a memory 52, a content storage database (DB) 53, a recording device 54, and a processor 55. The input/output interface 51, the memory 52, the content storage database 53, the recording device 54, and the processor 55 are connected to each other via an internal bus BS1 such that data or information can be input/output.

The input/output interface 51 is configured with an input/output circuit capable of wired or wireless transmission and reception of data or information to and from each of the projector 10, the IR camera 40, the input device IP, and the display device DP. Although illustration is omitted in FIG. 2, the input/output interface 51 may be connected to the IR illumination 20 such that wired or wireless transmission and reception of data or information is enabled to and from the IR illumination 20.

The memory 52 is configured using, for example, a RAM and a ROM, and temporarily holds a program and data necessary for executing an operation of the projection control device 50, and data or information generated during the operation. The RAM is, for example, a work memory used when the projection control device 50 operates. The ROM stores and holds, for example, a program and data for controlling the projection control device 50 in advance. Specifically, the ROM holds a program and data for causing the processor 55 to be able to functionally implement each of a calibration unit 551, a silhouette image generation unit 552, a projection position calculation unit 553, and a projection image generation unit 554. The program and the data for functionally implementing these units are read and dynamically executed by the processor 55 during execution as, for example, a dynamic link library (DLL). Accordingly, the processor 55 can functionally implement each of the calibration unit 551, the silhouette image generation unit 552, the projection position calculation unit 553, and the projection image generation unit 554.

The memory 52 holds, for example, information on a resolution (specifically, the number of pixels in a vertical direction and the number of pixels in a horizontal direction) of the infrared captured image generated by the IR camera 40 and information on a size (an area) of the screen 30 projected by the projector 10.

The content storage database 53 (an example of a content holding unit) is configured using, for example, a hard disk drive (HDD) or a solid state drive (SSD), and stores and holds data of a content image to be disposed in a projection image projected by the projector 10.

The recording device 54 is configured using, for example, an HDD or an SSD, and records data or information sent from the input device IP, the IR camera 40, or the visible camera 40C by the projection control device 50, or records data of a projection image to be projected by the projector 10 (specifically, data of a projection image generated by the processor 55).

The processor 55 is configured using, for example, a CPU, an MPU, a DSP, or an FPGA. The processor 55 functions as a controller that administrates overall operations of the projection control device 50, and performs a control processing for controlling an operation of each component of the projection control device 50, a data input/output processing to and from each component of the projection control device 50, a data arithmetic operation (calculation) processing, and a data storage processing. The processor 55 operates according to a program and data stored in the memory 52. The processor 55 uses the memory 52 during an operation, and temporarily saves data or information generated or acquired by the processor 55 in the memory 52.

The processor 55 includes, for example, at least the calibration unit 551, the silhouette image generation unit 552, the projection position calculation unit 553, and the projection image generation unit 554. As described above, each of the calibration unit 551, the silhouette image generation unit 552, the projection position calculation unit 553, and the projection image generation unit 554 can be functionally implemented by, for example, the processor 55 reading and executing the program and the data stored in advance in the memory 52.

The calibration unit 551 performs a processing (that is, calibration) of obtaining a relational expression (for example, a projection conversion matrix) of a conversion processing that determines a correspondence relationship between a position (specifically, coordinates) in the infrared captured image generated by the IR camera 40 and a position (specifically, coordinates) in the projection image projected by the projector 10. Specifically, the calibration unit 551 detects where four corners of the projection image are positioned in the infrared captured image by designation using the input device IP of the user or by a predetermined image processing (for example, an edge detection processing), and obtains, for example, the above-described projection conversion matrix (see FIG. 3). The calibration unit 551 may perform a processing (that is, calibration) of obtaining a relational expression (for example, a projection conversion matrix) of a conversion processing that determines a correspondence relationship between a position (specifically, coordinates) in the visible captured image generated by the visible camera 40C and a position (specifically, coordinates) in the projection image projected by the projector 10. Specifically, the calibration unit 551 detects where four corners of the projection image are positioned in the visible captured image by designation using the input device IP of the user or by a predetermined image processing (for example, an edge detection processing), and obtains, for example, the above-described projection conversion matrix.

Figure 3:
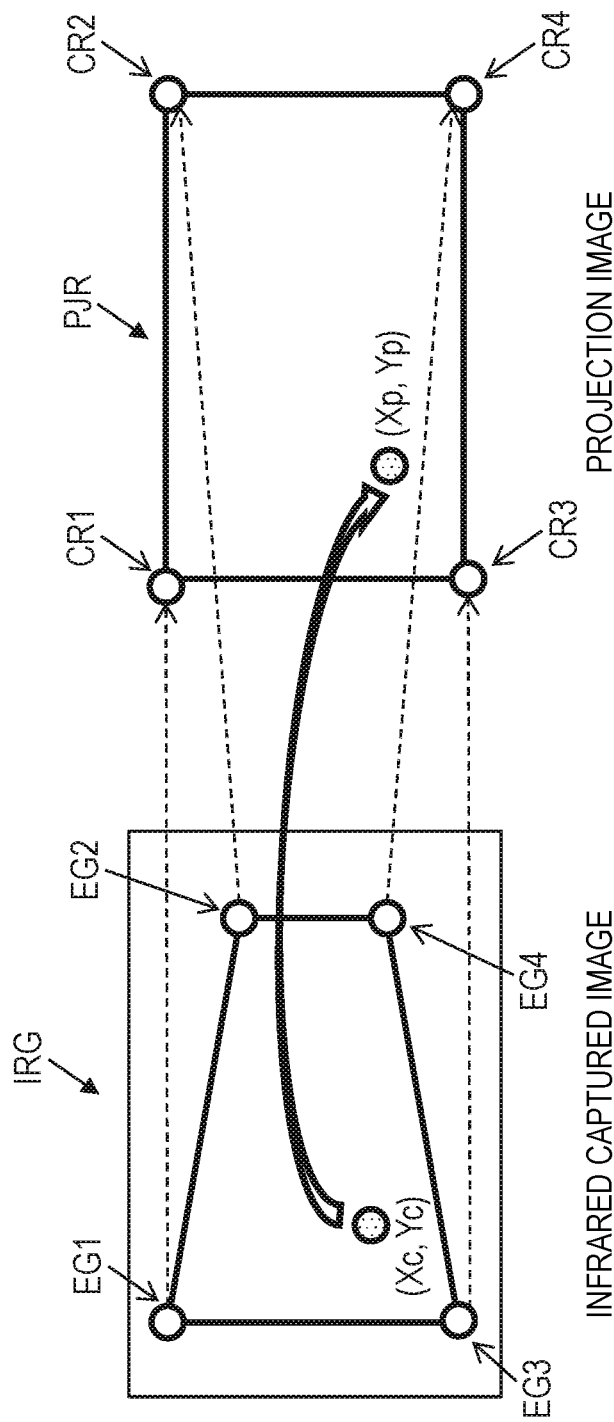
FIG. 3 is an explanatory diagram showing an example of calibration for coordinate conversion between coordinates (Xc, Yc) indicating a position in an infrared captured image of an IR camera and coordinates (Xp, Yp) indicating a position in a projection image projected by a projector.

FIG. 3 is an explanatory diagram showing an example of calibration for conversion between coordinates (Xc, Yc) indicating a position in an infrared captured image IRG of the IR camera 40 and coordinates (Xp, Yp) indicating a position in a projection image PJR projected by the projector 10. End points EG1, EG2, EG3, and EG4 in the infrared captured image IRG respectively correspond to end points CR1, CR2, CR3, and CR4 of four corners of the projection image PJR selected by the designation using the input device IP of the user, for example, in a state where the infrared captured image IRG and the projection image PJR are displayed in contrast on the display device DP (see FIG. 3).

As described above, the calibration unit 551 may automatically detect the end points EG1, EG2, EG3, and EG4 in the infrared captured image IRG by executing the image processing (for example, the edge detection processing or a straight line detection processing) on the infrared captured image IRG without the designation using the input device IP of the user. In this case, the calibration unit 551 selects the end points EG1, EG2, EG3, and EG4 detected by the image processing as end points corresponding to the end points CR1, CR2, CR3, and CR4 of the four corners of the projection image PJR, respectively.

The calibration unit 551 calculates and obtains a projection conversion matrix for converting the coordinates (Xc, Yc) in the infrared captured image IRG into the coordinates (Xp, Yp) in the projection image PJR based on coordinates of the end points EG1, EG2, EG3, and EG4 in the infrared captured image IRG and coordinates of the end points CR1, CR2, CR3, and CR4 of the four corners of the projection image PJR. The calibration unit 551 saves data or information of the obtained projection conversion matrix in the memory 52 as a calibration result. Accordingly, the projection control device 50 can accurately convert the optional coordinates (Xc, Yc) in the infrared captured image IRG into the corresponding coordinates (Xp, Yp) in the projection image PJR and obtain the corresponding coordinates (Xp, Yp) by using the calibration result.

In the projection control system 100 shown in FIG. 1, as long as a resolution (in other words, a size or an area) of the projection image projected by the projector 10 and a position of the IR camera 40 are not changed, the calibration processing of the calibration unit 551 may be executed at least once. In other words, every time the resolution of the projection image projected by the projector 10 or the position of the IR camera 40 is changed, the calibration processing of the calibration unit 551 is executed at least once.

The calibration method of the calibration unit 551 is not limited to the above-described method. For example, the calibration unit 551 can also convert the coordinates in the infrared captured image IRG into the corresponding coordinates in the projection image PJR in a unit of a pixel by executing calibration using a known structured light method.

Based on a visible captured image captured by the visible camera 40C, the silhouette image generation unit 552 (an example of a target object image generation unit) generates a silhouette image (an example of a target object image) in which a shape of the target object HM1 such as a person can be specified, by removing a background object of the visible captured image. For example, when the target object HM1 such as a person wears black tights on the white screen 30, when the target object HM1 such as a person wears white tights on the black screen 30, or when a green back or a blue back used in computer graphics (CG) is used, the silhouette image generation unit 552 can generate a silhouette image in which the background object is more accurately removed.

Based on an infrared captured image captured by the IR camera 40, the silhouette image generation unit 552 (an example of the target object image generation unit) generates a silhouette image (an example of the target object image) in which a shape of the target object HM1 such as a person can be specified. For example, when the IR illumination 20 is used and a marker that can reflect infrared rays (IR light) is used for the screen 30 having a material that can absorb the infrared rays (the IR light), or when the IR illumination 20 is used and a marker that can absorb the infrared rays (the IR light) is used for the screen 30 having a material that can reflect the infrared rays (the IR light), the silhouette image generation unit 552 can generate a silhouette image in which the background object is more accurately removed.

The silhouette image generation unit 552 may recognize an area at a distance in front of the screen 30 as a silhouette in which the target object HM1 is present, by using the above-described captured image of the visible camera 40C or the IR camera 40 and a distance sensor such as Kinect (registered trademark), and may generate a silhouette image by using the recognition result.

The projection position calculation unit 553 (an example of a derivation unit) derives a projection position of a content image in the projection image projected onto the screen 30 based on designation of parameters (an example of parameters related to the projection position) designated by a user operation on a designation screen (see FIGS. 5A, 5B, 5C, and 5D) and an image of the screen 30 including the target object HM1. The parameters are, for example, an angle and the number of pixels (n: an integer of 1 or more). However, in order to effectively eliminate an influence of noise, n is preferably an integer of 2 or more. Here, the image of the screen 30 including the target object HM1 is a silhouette image generated by the silhouette image generation unit 552. Specifically, as described above, the silhouette image is generated based on the infrared captured image captured by the IR camera 40 or the visible captured image captured by the visible camera 40C, or is generated using the distance sensor such as Kinect (registered trademark).

Specifically, the projection position calculation unit 553 uses the silhouette image generated by the silhouette image generation unit 552 to derive a detection position that satisfies the parameters designated by the user operation as a tip end position (that is, the projection position).

Here, the detection position that satisfies the parameters will be described with reference to FIGS. 4A, 4B, 4C, 4D, and 4E. Here, in order to facilitate understanding of the description, silhouette images FR1, FR2, and FR3 generated by the silhouette image generation unit 552 are, for example, infrared captured images in which the target object HM1 is black and other backgrounds are white (see FIGS. 4B to 4E).

Figure 4A:
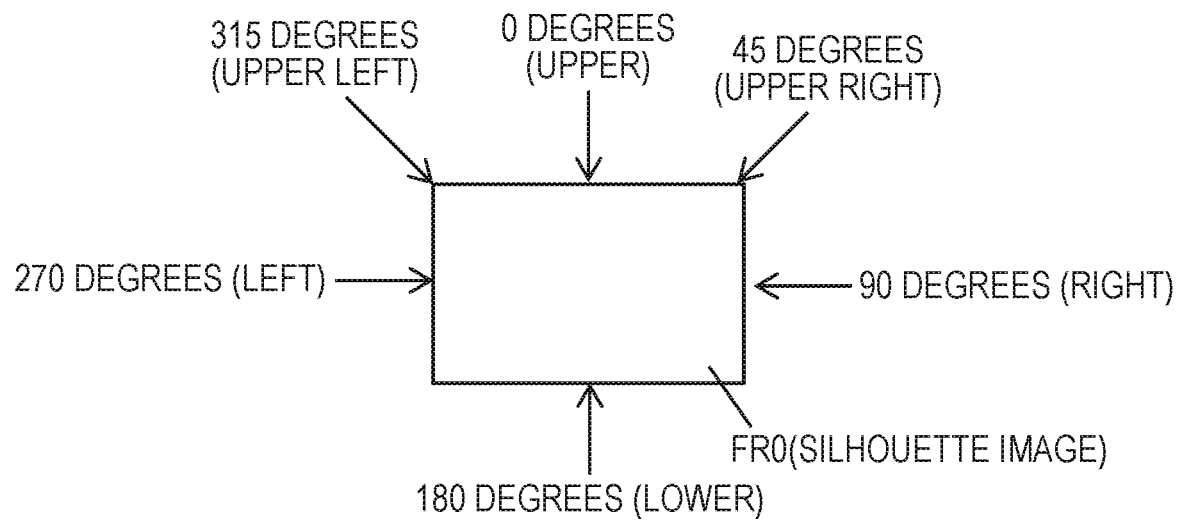
FIG. 4A is an explanatory diagram of a detection direction corresponding to a scan start position.
Figure 4B:
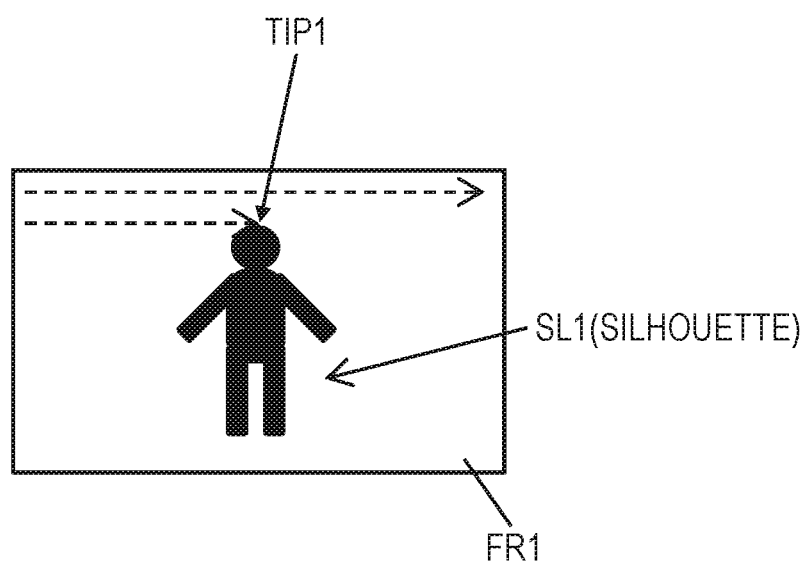
FIG. 4B is an explanatory diagram showing an example of scanning from 0 degrees (upper).
Figure 4C:
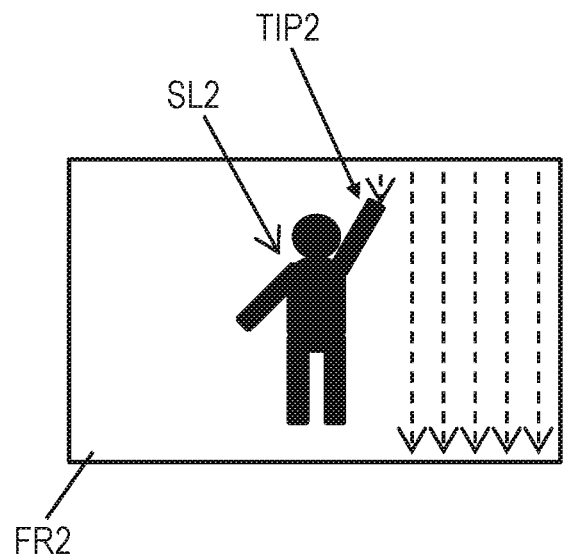
FIG. 4C is an explanatory diagram showing an example of scanning from 90 degrees (right).
Figure 4D:
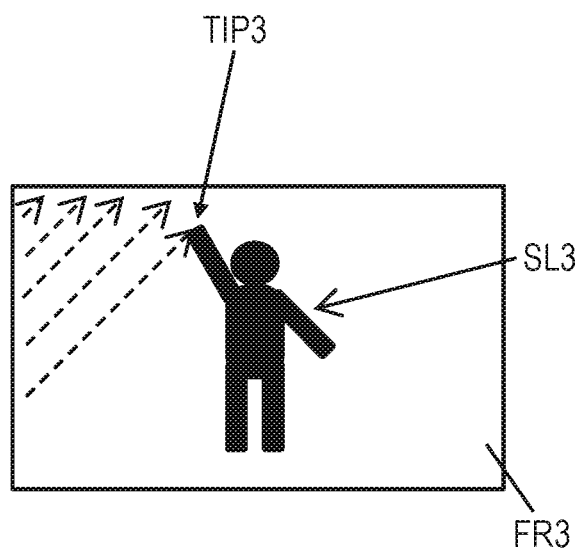
FIG. 4D is an explanatory diagram showing an example of scanning from 315 degrees (upper left).
Figure 4E:
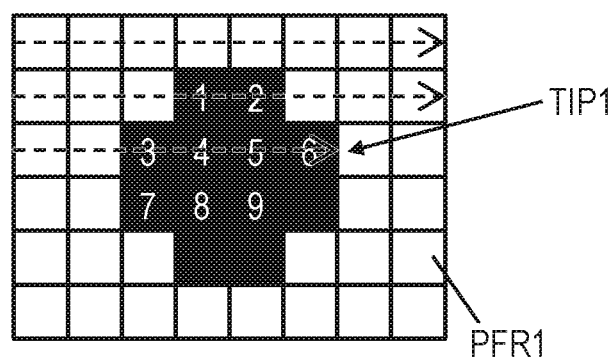
FIG. 4E is an explanatory diagram of a tip end position detected during a scan.

FIG. 4A is an explanatory diagram of a detection direction corresponding to a scan start position. FIG. 4B is an explanatory diagram showing an example of scanning from 0 degrees (upper). FIG. 4C is an explanatory diagram showing an example of scanning from 90 degrees (right). FIG. 4D is an explanatory diagram showing an example of scanning from 315 degrees (upper left). FIG. 4E is an explanatory diagram of a tip end position detected during a scan.

In order to derive a projection position, the projection position calculation unit 553 performs a rotation processing of a silhouette image generated by the silhouette image generation unit 552 counterclockwise by an angle designated by a user operation as an example of the image processing. After the rotation processing in the counterclockwise direction, the projection position calculation unit 553 reads pixel values while performing a scan in an order from a starting end (for example, an upper left end point) of the silhouette image subjected to the rotation processing in a horizontal direction. During the scan, the projection position calculation unit 553 derives, as the tip end position, a detection position of an n-th pixel that matches the designated number of pixels (n) in an image of the target object HM1.

In FIG. 4A, an angle rotated by the projection position calculation unit 553 corresponding to an angle designated by a user operation for the silhouette image FR0 is exemplified. Here, as an angle designated by a user operation or a direction corresponding to the angle, "0 degrees" or "upper", "45 degrees" or "upper right", "90 degrees" or "right", "180 degrees" or "lower", "270 degrees" or "left", and "315 degrees" or "upper left" are exemplified. Information on angles (for example, "45 degrees" and "180 degrees") corresponding to directions (for example, "upper right" and "lower") designated by a user operation is registered in the memory 52 in advance.

For example, when the angle "0" or the direction "upper" is designated by a user operation, the projection position calculation unit 553 performs a rotation processing of the silhouette image FR1 counterclockwise by 0 degrees, and then reads pixel values while performing a scan in an order from a starting end (for example, an upper left end point) of the silhouette image FR1 after the rotation processing in a horizontal direction. During the scan, the projection position calculation unit 553 derives a detection position TIP1 of an n-th pixel that matches the number of pixels (n) designated by a user operation in an image of the silhouette SL1 (an example of the target object HM1) as the tip end position (that is, the projection position) (see FIG. 4B).

For example, when the angle "90" or the direction "right" is designated by a user operation, the projection position calculation unit 553 performs the rotation processing of the silhouette image FR2 counterclockwise by 90 degrees, and then reads pixel values while performing a scan in an order from a starting end (for example, an upper left end point) of the silhouette image FR2 after the rotation processing in a horizontal direction. During the scan, the projection position calculation unit 553 derives a detection position TIP2 of an n-th pixel that matches the number of pixels (n) designated by a user operation in an image of the silhouette SL2 (an example of the target object HM1) as the tip end position (that is, the projection position) (see FIG. 4C).

For example, when the angle "315" or the direction "upper left" is designated by a user operation, the projection position calculation unit 553 performs the rotation processing of the silhouette image FR3 counterclockwise by 315 degrees, and then reads pixel values while performing a scan in an order from a starting end (for example, an upper left end point) of the silhouette image FR3 after the rotation processing in a horizontal direction. During the scan, the projection position calculation unit 553 derives a detection position TIP3 of an n-th pixel that matches the number of pixels (n) designated by a user operation in an image of the silhouette SL3 (an example of the target object HM1) as the tip end position (that is, the projection position) (see FIG. 4D).

As shown in FIG. 4E, the projection position calculation unit 553 derives, as the tip end position (that is, the projection position), the detection position TIP1 of a sixth pixel that matches the number of pixels (for example, six pixels) designated by a user operation while scanning a part of the silhouette image FR1 (for example, a partial silhouette image PFR1 obtained by enlarging a vicinity of a head of the silhouette SL1) in a manner shown in FIG. 4B.

Figure 5B:
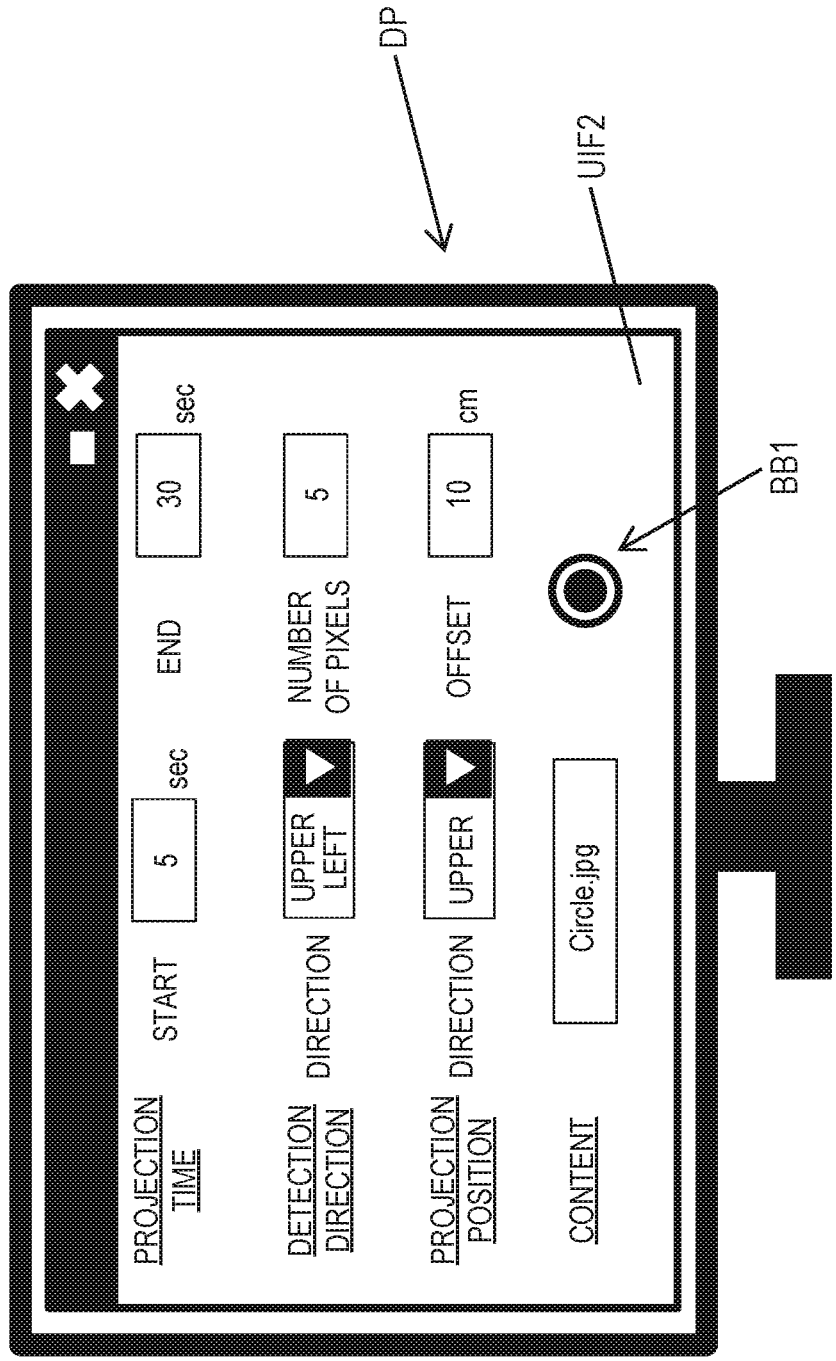
FIG. 5B is a diagram showing an example of a designation screen based on a direction.
Figure 5C:
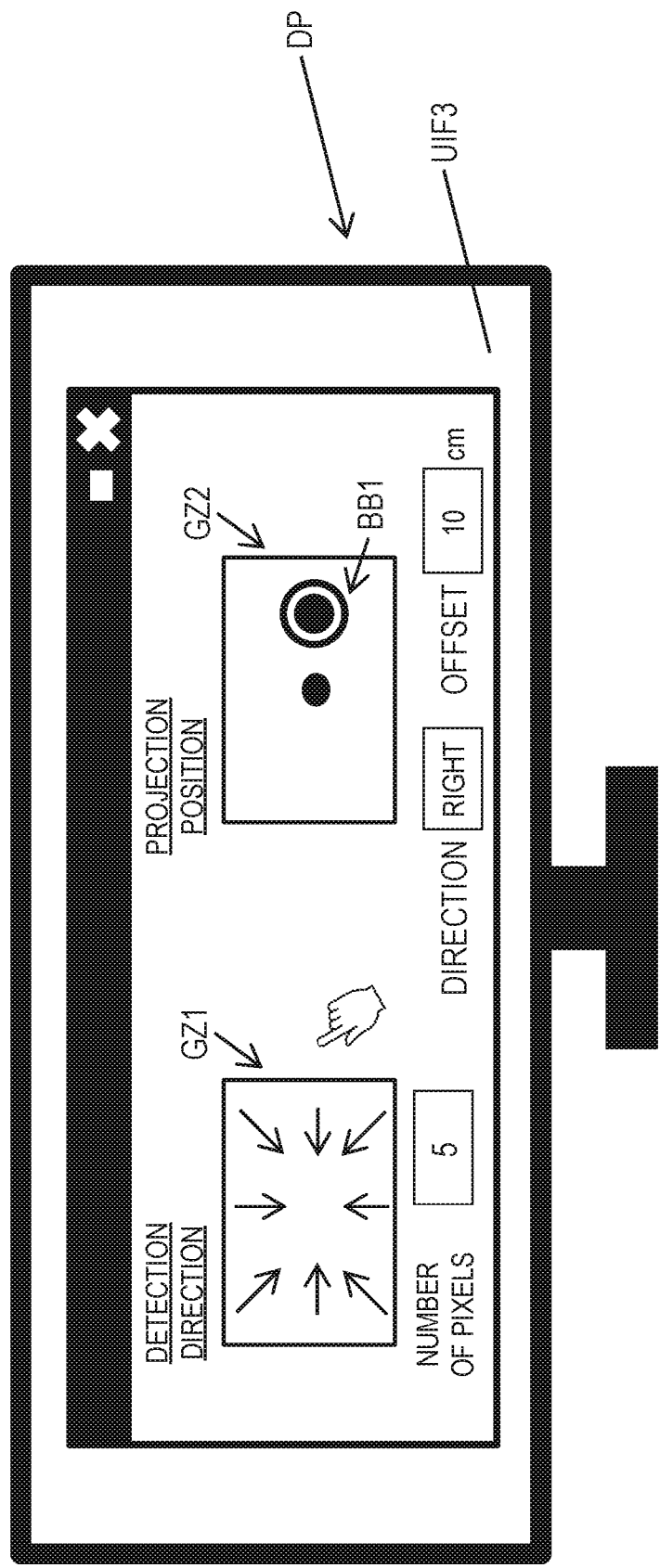
FIG. 5C is a diagram showing an example of a designation screen based on an image.
Figure 5D:
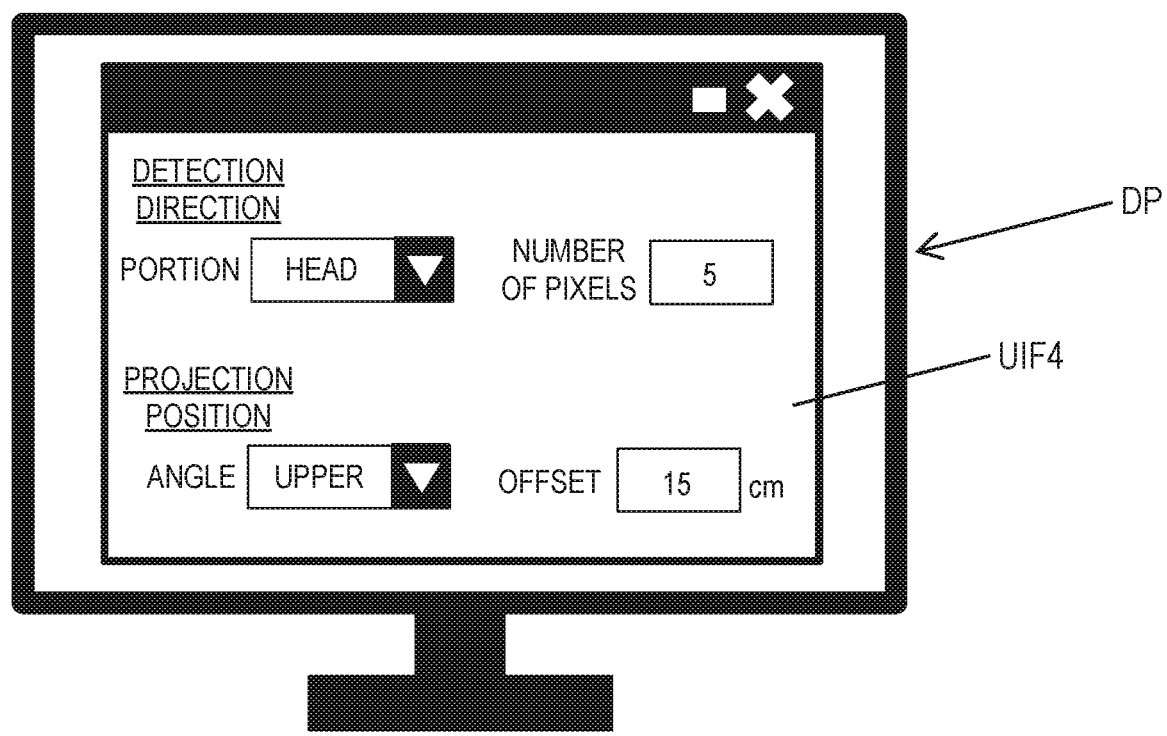
FIG. 5D is a diagram showing an example of a designation screen based on a portion.

Here, a designation screen for designating parameters by a user operation will be described with reference to FIGS. 5A, 5B, 5C, and 5D. FIG. 5A is a diagram showing an example of a designation screen based on an angle. FIG. 5B is a diagram showing an example of a designation screen based on a direction. FIG. 5C is a diagram showing an example of a designation screen based on an image. FIG. 5D is a diagram showing an example of a designation screen based on a portion.

For example, a designation screen UIF1 shown in FIG. 5A is displayed on the display device DP by the processor 55, and includes designation fields for items of a start timing and an end timing, an item of a detection direction, an item of a projection position, and an item of a content as an example of parameters.

In the items of the start timing and the end timing, the start timing and the end timing of a projection time at which the content image is projected by the projector 10 are designated. For example, the above-described angle and the number of pixels are designated in the item of the detection direction. In the item of the projection position, for example, an index (for example, a direction and a distance) for defining an offset amount for giving and displaying an offset from a projection position derived by the projection position calculation unit 553 is designated. A unit of a distance may be mm (millimeter) or a pixel in addition to cm (centimeter). In the item of the content, a name of the content image is designated. Accordingly, the processor 55 of the projection control device 50 can display in a preview a content image BB1 corresponding to the designated name on the designation screen UIF1.

For example, a designation screen UIF2 shown in FIG. 5B is displayed on the display device DP by the processor 55, and includes designation fields for the items of the start timing and the end timing, an item of a detection direction, the item of the projection position, and the item of the content as an example of parameters. A difference between the designation screen UIF2 and the designation screen UIF1 is the item of the detection direction, and other items are the same. Therefore, the description of the same content will be omitted, and a different content will be described here.

In the item of the detection direction, for example, a direction and the number of pixels corresponding to the above-described angle are designated.

For example, a designation screen UIF3 shown in FIG. 5C is displayed on the display device DP by the processor 55, and includes designation fields for an item of a detection direction and an item of a projection position as an example of parameters. In the item of the detection direction, for example, an angle or a direction corresponding to the angle selected (designated) from a designation screen GZ1 where an image format can be selected, and the number of pixels are designated. For example, items of a direction and a distance, which are definition items of the above-described offset amount, are designated in the item of the projection position. Accordingly, the processor 55 of the projection control device 50 can display in a preview a preview screen GZ2 where a projection position of the content image (for example, the content image BB1) can be identified, on the designation screen UIF2 according to the designated offset amount.

For example, a designation screen UIF4 shown in FIG. 5D is displayed on the display device DP by the processor 55, and includes designation fields for an item of a detection portion and the item of the projection position as an example of parameters. In the item of the detection portion, for example, a portion (for example, a head) of a silhouette of a person or the like and the number of pixels are designated. In the item of the projection position, for example, the index (for example, the direction and the distance) for defining the offset amount for giving and displaying the offset from the projection position derived by the projection position calculation unit 553 is designated. Accordingly, the user can visually recognize a projection image in which a content image is disposed in the vicinity of the designated portion simply by designating a characteristic portion where the content image is projected onto the silhouette without designating a direction or an angle. In the memory 52, information on an angle (for example, "0 degrees", "270 degrees") corresponding to a portion (for example, a "head", a "right hand") designated by a user operation is registered in advance.

The projection image generation unit 554 generates a projection image to be projected from the projector 10 onto the screen 30 based on an image of the screen 30 that includes the target object HM1 and is captured by the IR camera 40 or the visible camera 40C and a projection position derived by the projection position calculation unit 553.

Specifically, the projection image generation unit 554 acquires a silhouette image generated by the silhouette image generation unit 552. The projection image generation unit 554 generates a projection image in which a content image read from the content storage database 53 is disposed at a projection position derived corresponding to a position indicating a range of the target object HM1 in a silhouette image or at a position away from the projection position by a distance corresponding to an offset amount, by using the silhouette image (in other words, a shape of the target object HM1 on the screen 30), a calibration result held in the memory 52, and a derivation result of the projection position calculation unit 553. The processor 55 generates a projection instruction including the generated projection image, and sends the generated projection instruction to the projector 10 via the input/output interface 51. A content image to be disposed in the projection image may be selected in advance by a user operation, or may be selected from a plurality of content images according to a projection position derived by the projection position calculation unit 553.

Figure 6:
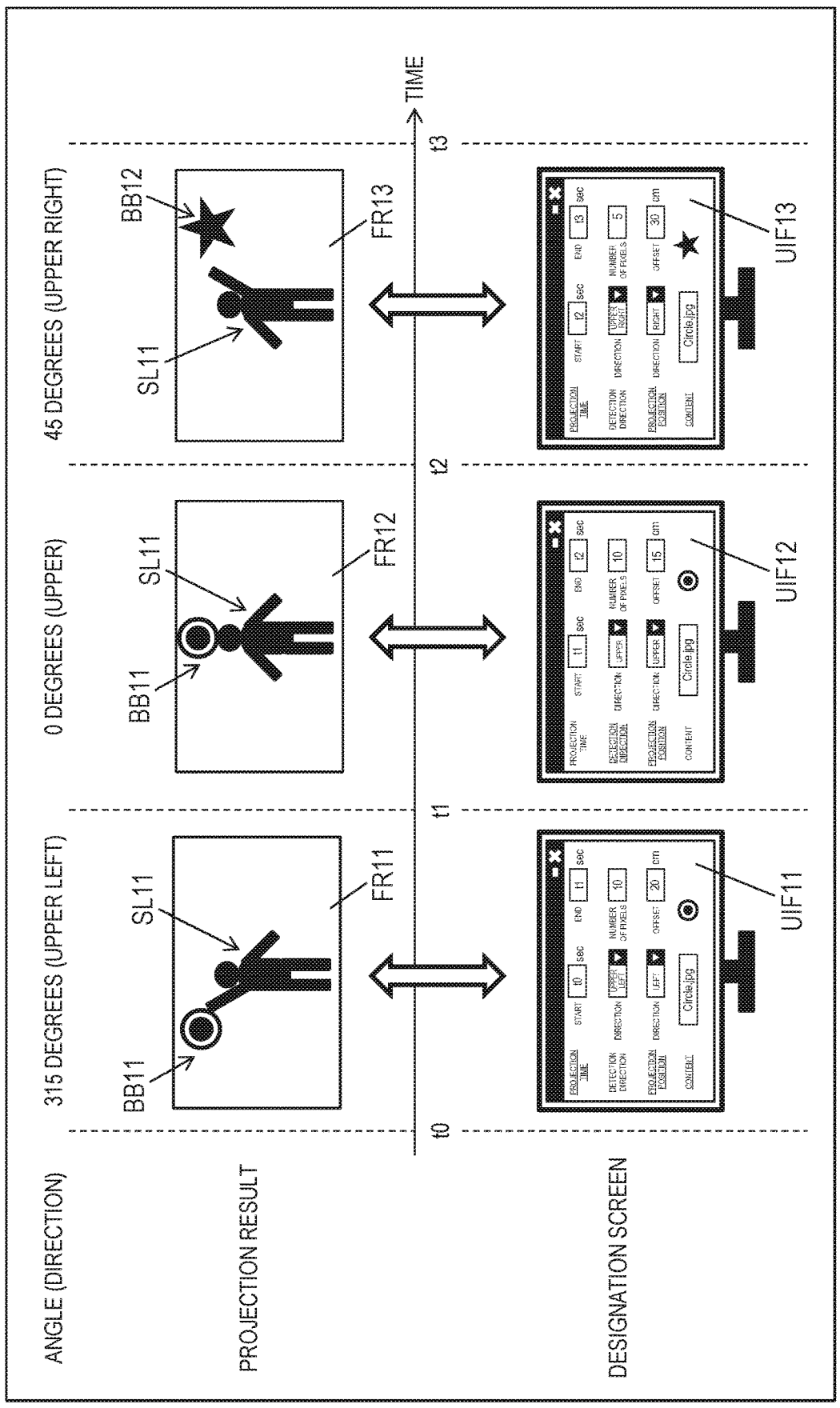
FIG. 6 is a diagram showing an example of a projection position based on a timeline and an example of a user designation screen in association with each other.

FIG. 6 is a diagram showing an example of a projection position based on timeline designation and an example of a user designation screen in association with each other. A horizontal axis in FIG. 6 indicates time. In the first embodiment, the projection control device 50 can change a projection position of a content image of a projection image projected from the projector 10 in time series by designating a timeline by a user operation.

As shown in FIG. 6, for example, during a period from time t0 to time t1, the direction "upper left" is designated by the parameters (for example, the designation fields of the projection time, the detection direction, the projection position, and the content, see FIG. 4B) designated on a designation screen UIF11 by a user operation. Therefore, the projection control device 50 derives a position corresponding to a designated offset amount from a position corresponding to a right-hand portion of a silhouette SL11 of a silhouette image FR11 as the projection position. Then, the projection control device 50 projects a projection image in which the content image BB1 is disposed at the derived projection position during the time t0 to t1.

Similarly, for example, during a period from the time t1 to a time t2, the direction "upper" is designated by the parameters (for example, the designation fields of the projection time, the detection direction, the projection position, and the content, see FIG. 4B) designated on a designation screen UIF12 by a user operation. Therefore, the projection control device 50 derives a position corresponding to a designated offset amount from a position corresponding to a head portion of a silhouette SL12 of a silhouette image FR12 as the projection position. Then, the projection control device 50 projects a projection image in which the content image BB1 is disposed at the derived projection position during the time t1 to t2.

Similarly, for example, during a period from the time t2 to a time t3, the direction "upper right" is designated by the parameters (for example, the designation fields of the projection time, the detection direction, the projection position, and the content, see FIG. 4B) designated on a designation screen UIF13 by a user operation. Therefore, the projection control device 50 derives a position corresponding to a designated offset amount from a position corresponding to a left-hand portion of a silhouette SL13 of a silhouette image FR13 as the projection position. Then, the projection control device 50 projects a projection image in which the content image BB2 is disposed at the derived projection position during the time t2 to t3.

Figure 7B:
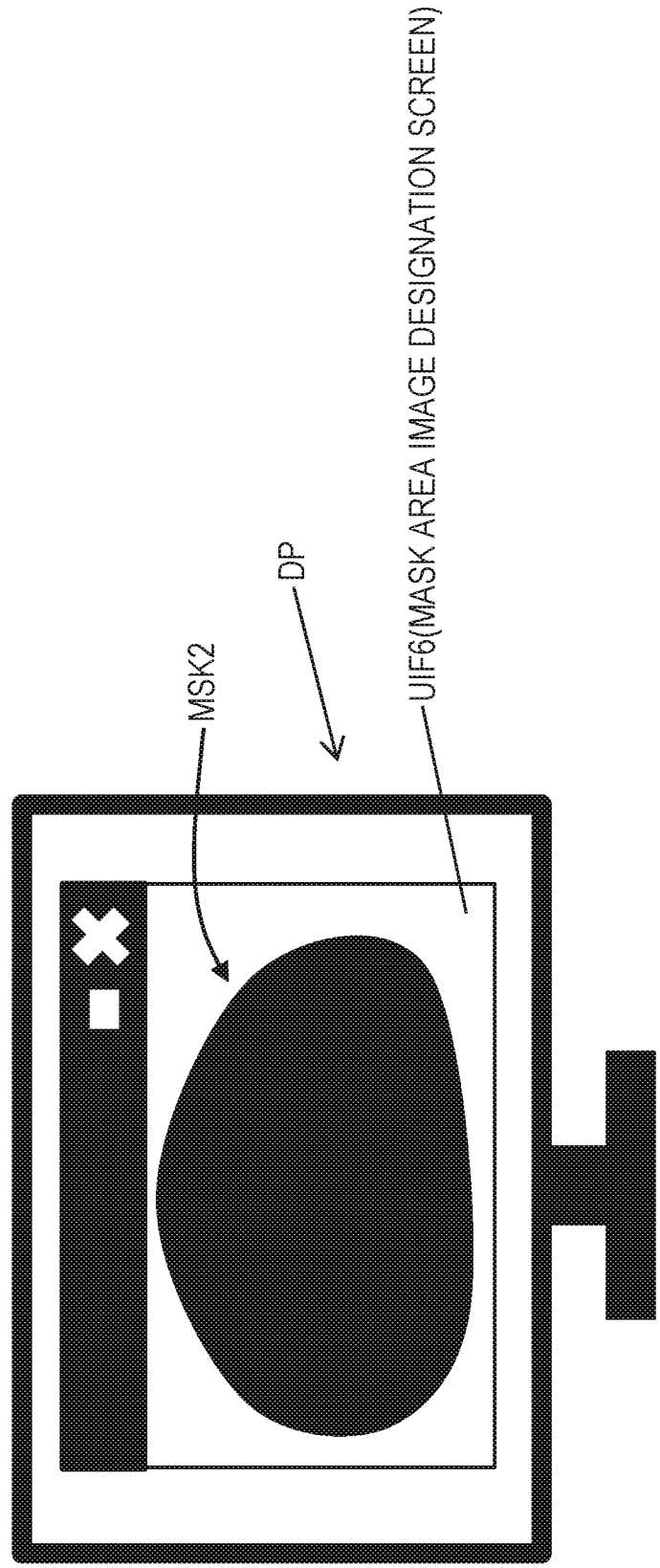
FIG. 7B is a diagram showing an example of a designation screen of a calculation target area of a projection position.

FIGS. 7A and 7B are diagrams showing examples of designation screens of calculation target areas of projection positions. A noise signal NZ1 may be superimposed on the silhouette image FR1 generated by the silhouette image generation unit 552 depending on a situation while capturing an image by the IR camera 40 or the visible camera 40C. The noise signal NZ1 may be erroneously recognized as a silhouette in the silhouette image FR1.

Therefore, as shown in FIG. 7A, the processor 55 of the projection control device 50 displays an area designation screen UIF5 on the display device DP to prompt the user to designate an area that is a target of calculation of a projection position (an example of derivation) by a user operation. For example, on the area designation screen UIF5, an area having a substantially elliptical shape that is the target of the calculation of the projection position is designated so as to exclude the noise signal NZ1 by a user operation using a drawing tool PCL1. The projection control device 50 calculates (derives) the projection position in the designated area by the method described with reference to FIGS. 4A to 4E.

As shown in FIG. 7B, the processor of the projection control device 50 may display a mask area image designation screen UIF6 on the display device DP to prompt the user to designate an area that is the target of the calculation of the projection position (an example of derivation) by a user operation. For example, on the mask area image designation screen UIF6, a mask area image MSK1 having a substantially elliptical shape is designated by a user operation so as to exclude the noise signal NZ1. The projection control device 50 calculates (derives) the projection position in the designated mask area image MSK1 by the method described with reference to FIGS. 4A to 4E.

(Functions of Projection Control System)

Figure 8:
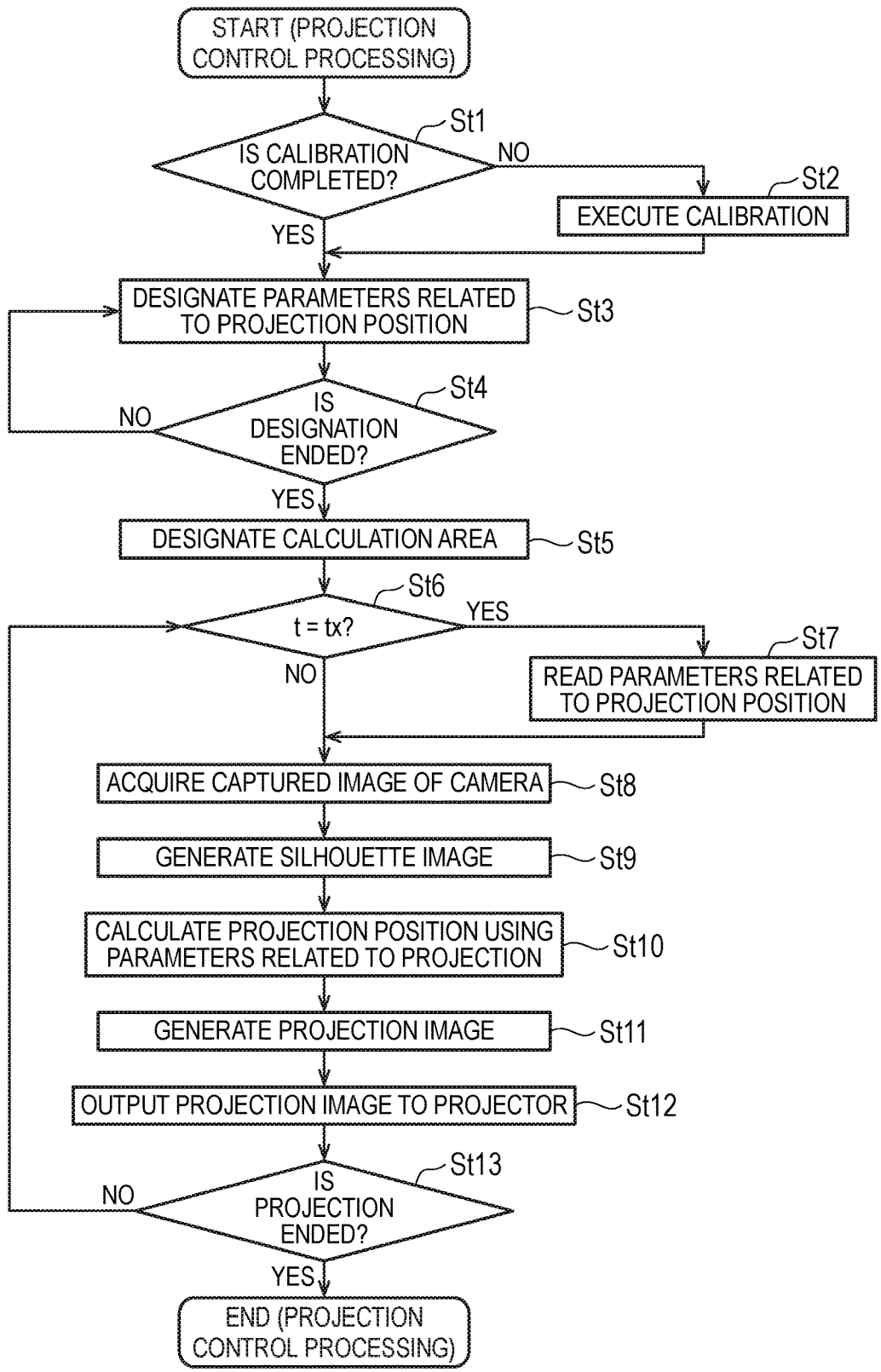
FIG. 8 is a flowchart showing an example of an operation procedure of a projection control device according to the first embodiment in time series.

Next, an operation procedure of the projection control device 50 according to the first embodiment will be described with reference to FIG. 8. FIG. 8 is a flowchart showing an example of the operation procedure of the projection control device according to the first embodiment in time series.

In FIG. 8, the processor 55 of the projection control device 50 determines whether a calibration processing has already been executed (SU). The processing of step St1 can be executed by, for example, the processor 55 depending on whether a calibration result of the calibration unit 551 is held in the memory 52. When it is determined that the calibration processing has already been executed (St1, YES), the processing of the projection control device 50 proceeds to step St3. On the other hand, when it is determined that the calibration processing has not been executed at all (St1, NO), the calibration processing is executed by the calibration unit 551 (St2).

When it is determined that the calibration processing has already been executed (St1, NO), or after the processing of step St2, the processor 55 displays a designation screen (for example, see FIG. 5A, 5B, 5C, or 5D) on the display device DP in order to designate parameters related to a projection position by a user operation. By the user operation, the parameters (see the above description) related to the projection position are input and designated on the designation screen (St3). The processing of step St3 is continued until the designation of the parameters related to the projection position by the user operation is ended (St4, NO).

When the designation by the user operation ends (St4, YES), the processor 55 displays the area designation screen UIF5 or the mask area image designation screen UIF6 on the display device DP to prompt the user to designate an area that is a target of calculation of the projection position (an example of derivation) by a user operation (St5). The processor 55 temporarily holds, in the memory 52, the area designated by the user operation as the area that is the target of calculation (derivation) of the projection position. When the area is not designated by the user operation, the processing of step St5 may be omitted.

When time t=tx (that is, projection time designated on a designation screen of FIG. 5A or 5B) is satisfied (St6, YES), the processor 55 reads the parameters related to the projection position temporarily held in the memory 52 (St7).

After step St7 or when the time t=tx is not satisfied (St6, NO), the processor 55 acquires an image captured by the IR camera 40 or the visible camera 40C (St8). The silhouette image generation unit 552 of the processor 55 generates a silhouette image in which a shape of the target object HM1 such as a person can be specified, by using the image acquired in step St8 (St9).

The projection position calculation unit 553 of the processor 55 derives a projection position of a content image in a projection image projected onto the screen 30 by using the silhouette image generated in step St9 and the parameters related to the projection position designated in step St3 (St10).

The projection image generation unit 554 of the processor 55 generates a projection image in which a content image read from the content storage database 53 is disposed at a projection position derived corresponding to a position indicating a range of the target object HM1 in a silhouette image or at a position away from the projection position by a distance corresponding to an offset amount by using the silhouette image, the calibration result held in the memory 52, and the derivation result of the projection position calculation unit 553 by using information on the projection position derived in step St10 (St11).

The processor 55 generates a projection instruction including the projection image generated in step St11, and sends the generated projection instruction to the projector 10 via the input/output interface 51 (St12). Accordingly, the projector 10 can project, toward the screen 30, projection light (visible light) for projecting a projection image sent from the projection control device 50 onto the screen 30.

After step St12, for example, when an instruction to end the projection is input or the like by a user operation (St13, YES), the processing of the projection control device 50 ends. On the other hand, as long as the instruction to end the projection is not input (St13, NO), the processing of the projection control device 50 returns to step St6, and the processings of steps St6 to St13 are repeated until the instruction to end the projection is input or the like by the user operation.

(Effects of Projection Control System)

As described above, in the projection control device 50 or the projection control system 100 according to the first embodiment, the input/output interface 51 (an example of a communication unit) is connected to communicate with the IR camera 40 (an example of an image capturing device) or the visible camera 40C (an example of the image capturing device) that captures an image of the target object HM1 such as a person positioned around the screen 30 (an example of a projected object). The projection position calculation unit 553 (an example of a derivation unit) derives a projection position of a content image based on designation of parameters related to the content image to be projected onto the screen 30 and an image of the screen 30 including the target object HM1. The projection image generation unit 554 generates a projection image including the content image disposed at the derived projection position. The processor 55 (an example of a control unit) transmits a projection instruction of the generated projection image to the projector 10 (an example of a projection device) via the input/output interface 51.

Accordingly, the projection control device 50 or the projection control system 100 can implement projection control based on accurate and simple designation of a projection position of the content image that follows a movement of the target object HM1 such as a person around the screen 30. Therefore, according to the projection control device 50 or the projection control system 100, it is possible to adaptively support improvement of user convenience.

In the projection control device 50 or the projection control system 100, the silhouette image generation unit 552 (an example of a target object image generation unit) generates, based on the image of the screen 30, a target object image in which a shape of the target object HM1 such as a person can be specified. The projection position calculation unit 553 derives a projection position by using a generated silhouette image (an example of the target object image). Accordingly, since the projection control device 50 or the projection control system 100 can acquire an image in which the shape of the target object HM1 in a captured image is clearly specified as a silhouette with the screen 30 as a subject, it is possible to calculate an appropriate projection position according to parameters designated by a user operation.

In the projection control device 50 or the projection control system 100, the processor 55 displays a designation screen (for example, see FIGS. 5A, 5B, 5C, and 5D) of parameters related to a projection position on the display device DP, and receives designation of the parameters related to the projection position in response to a user operation for the designation screen. Accordingly, the projection control device 50 or the projection control system 100 can derive the projection position for disposing the content image in the projection image by using the parameters designated by a simple user operation.

In the projection control device 50 or the projection control system 100, the projection position calculation unit 553 changes a derivation method of the projection position according to designation of parameters related to the content image. Accordingly, when deriving a position in the projection image onto which the content image is projected, the projection control device 50 or the projection control system 100 can quickly and appropriately calculate the projection position by changing a scan start position in the silhouette image according to a content (for example, an angle or a direction) of the parameters, or the like.

In the projection control device 50 or the projection control system 100, the parameters related to the projection position include an angle or a direction, and the number of pixels (n: an integer of 2 or more). The projection position calculation unit 553 performs a scan from a starting end corresponding to an angle or a direction of an image of the screen 30 to a terminal end of the image, and derives the projection position based on a detection position of a pixel (that is, an n-th pixel) that matches the number of pixels in an image of the target object HM1 during the scan. For example, the projection position calculation unit 553 may derive the same position as the n-th detection position, a position around the same position, or the like as the projection position. Accordingly, the projection control device 50 or the projection control system 100 can eliminate an influence of a noise signal that may appear in the silhouette image, and can derive the projection position for disposing the content image with high accuracy by using the angle or the direction and the number of pixels designated by a user operation.

In the projection control device 50 or the projection control system 100, the parameters related to the content image further include a projection period for projecting the content image. The processor 55 of the projection control device 50 transmits the projection instruction of the projection image during the projection period to the projector 10 via the input/output interface 51. Accordingly, since the projection control device 50 or the projection control system 100 can finely designate projectable time of the content image, it is possible to support a presentation of projection of the content image of the user.

In the projection control device 50 or the projection control system 100, the memory 52 or the recording device 54 holds information (see FIG. 6) on the projection position derived based on the parameters related to the content image designated correspondingly for each of a plurality of different projection periods. The processor 55 of the projection control device 50 transmits, to the projector 10 via the input/output interface 51, a projection instruction of each projection image generated using each projection position derived correspondingly for each of the plurality of different projection periods. Accordingly, the projection control device 50 or the projection control system 100 can variously designate switching of content images projected onto the same or different projection positions at different projection times, and can support advanced presentation of projection of the content image of the user.

In the projection control device 50 or the projection control system 100, the parameters related to the content image further include a direction and an offset value. The projection image generation unit 554 detects a reference position from the image (see the above description) of the screen 30 including the target object HM1, and derives a position away from the reference position by the offset value in the direction as the projection position. The reference position is, for example, a detection position of a pixel that matches the number of pixels in an image of the target object HM1 during a scan, the scan being performed by the projection position calculation unit 553 from a starting end corresponding to an angle or a direction of the image of the screen 30 to a terminal end of the image. Accordingly, the user can finely adjust the projection position of the content image derived according to the designated parameters, and convenience of the user can be improved.

In the projection control device 50 or the projection control system 100, the processor 55 displays a designation screen of a derivation target area of the projection position on the display device DP, and sets the derivation target area according to a user operation for the designation screen. The projection position calculation unit 553 derives the projection position from within the set derivation target area. Accordingly, according to the projection control device 50 or the projection control system 100, the influence of the noise signal that may appear in the silhouette image can be eliminated, and the projection position of the content image can be derived more accurately.

In the projection control device 50 or the projection control system 100, the processor 55 acquires a derivation target area image showing the derivation target area of the projection position. The projection position calculation unit 553 derives the projection position from within the derivation target area shown by the acquired derivation target area image. Accordingly, according to the projection control device 50 or the projection control system 100, the influence of the noise signal that may appear in the silhouette image can be eliminated, and the projection position of the content image can be derived more accurately.

Although various embodiments have been described above with reference to the accompanying drawings, the present disclosure is not limited to these embodiments. It will be apparent to those skilled in the art that various changes, modifications, substitutions, additions, deletions, and equivalents can be conceived within the scope of the claims, and it should be understood that such changes and the like also belong to the technical scope of the present disclosure. Components in the above-described embodiments may be combined optionally within a range not departing from the spirit of the invention.

The present application is based on Japanese Patent Application (Japanese Patent Application No. 2018-150634) filed on Aug. 9, 2018, and the contents of which are incorporated herein by reference.

INDUSTRIAL APPLICABILITY

The present disclosure is useful as a projection control device, a projection control method and a projection control system that implement projection control based on accurate and simple designation of a projection position of a content image that follows a movement of a target object around a projected object and adaptively support improvement of user convenience.

REFERENCE SIGNS LIST

10: projector
11, 43, 43C: communication interface
12, 42, 42C: control unit
13: projection unit
14, 44, 44C, 52: memory
20: IR illumination
30: screen
40: IR camera
40C: visible camera
41: IR image capturing unit
41C: visible image capturing unit
50: projection control device
51: input/output interface
53: content storage database
54: recording device
55, PRC1, PRC2, PRC3: processor
100: projection control system
551: calibration unit
552: silhouette image generation unit
553: projection position calculation unit
554: projection image generation unit
DP: display device
IP: input device

The invention claimed is:

1. A projection control device comprising:
a communication device connected to communicate with an image capturing device configured to capture an image of a target object positioned around a projected object;
a processor; and
a memory storing instructions that, when executed by the processor, cause the processor to perform operations, the operations comprising:
deriving a projection position of a content image based on designation of a parameter related to the content image to be projected onto the projected object and an image of the projected object including the target object;
generating a projection image including the content image disposed at the projection position; and
generating a projection instruction of the projection image to be transmitted to a projection device via the communication device,
wherein the parameter related to the content image includes an angle or a direction and the number of pixels (n: an integer of 2 or more),
wherein the operations further comprise: performing a scan from a starting end to a terminal end of the image of the projected object so as to correspond to the angle or the direction of the image, and wherein the projection position is derived based on a detection position of an n-th pixel in the image of the target object during the scan.

2. The projection control device according to claim 1, wherein the operations further comprise:

generating, based on the image of the projected object, a target object image capable of specifying a shape of the target object, and wherein the projection position is derived using the target object image.

3. The projection control device according to claim 1, wherein the operations further comprise:

generating a designation screen of the parameter related to the content image to be displayed on a display device; and receiving the designation of the parameter related to the content image in response to a user operation for the designation screen.

4. The projection control device according to claim 1, wherein the operations further comprise:

changing a derivation method of the projection position in response to the designation of the parameter related to the content image.

5. The projection control device according to claim 1, wherein the parameter related to the content image further includes a projection period for projecting the content image, and wherein the operations further comprise:

generating a projection instruction of the projection image for the projection period to be transmitted to the projection device via the communication device.

6. The projection control device according to claim 5, further comprising:

a storage configured to hold information on projection positions derived based on parameters related to the content image designated for a plurality of different projection periods, respectively, wherein the generating the projection instruction of the projection image comprises generating a projection instruction of projection images generated using the projection positions derived for the plurality of different projection periods, respectively.

7. The projection control device according to claim 1, wherein the parameter related to the content image includes a direction and an offset value, wherein the operations further comprise: detecting a reference position from the image of the projected object including the target object, and wherein the projection position is derived as a position away from the reference position by the offset value in the direction.

8. The projection control device according to claim 1, wherein the operations further comprise:

generating a designation screen of a derivation target area of the projection position to be displayed on a display device; and setting the derivation target area in response to a user operation for the designation screen, and wherein the projection position is derived from within the derivation target area.

9. The projection control device according to claim 1, wherein the operations further comprise: acquiring a derivation target area image indicating a derivation target area of the projection position, and wherein the projection position is derived from within the derivation target area indicated by the derivation target area image.

10. A projection control method of a projection control device, the projection control method comprising:

connecting the projection control device to an image capturing device to communicate with each other, the image capturing device being configured to capture an image of a target object positioned around a projected object;

deriving a projection position of a content image based on designation of a parameter related to the content image to be projected onto the projected object and an image of the projected object including the target object;

generating a projection image including the content image disposed at the projection position; and transmitting a projection instruction of the projection image to a projection device, wherein the parameter related to the content image includes an angle or a direction and the number of pixels (n: an integer of 2 or more), wherein the method further comprises: performing a scan from a starting end to a terminal end of the image of the projected object so as to correspond to the angle or the direction of the image, and wherein the projection position is derived based on a detection position of an n-th pixel in the image of the target object during the scan.

11. A projection control system comprising:

an image capturing device configured to capture an image of a target object positioned around a projected object; and a projection control device connected to communicate with the image capturing device, wherein the projection control device comprises:

a processor; and a memory storing instructions that, when executed by the processor, cause the processor to perform operations, the operations comprising:

deriving a projection position of a content image based on designation of a parameter related to the content image to be projected onto the projected object and an image of the projected object including the target object, generating a projection image including the content image disposed at the projection position, and generating a projection instruction of the projection image to be transmitted to a projection device, wherein the parameter related to the content image includes an angle or a direction and the number of pixels (n: an integer of 2 or more), wherein the operations further comprise: performing a scan from a starting end to a terminal end of the image of the projected object so as to correspond to the angle or the direction of the image, and wherein the projection position is derived based on a detection position of an n-th pixel in the image of the target object during the scan.

* * * * *